US012775951B2

(12) United States Patent
Sugegaya et al.

(10) Patent No.: US 12,775,951 B2
(45) Date of Patent: Oct. 27, 2026

(54) DETECTION SYSTEM, DETECTION METHOD, AND STORAGE MEDIUM

(71) Applicant: NEC Corporation, Tokyo (JP)

(72) Inventors: Hiroki Sugegaya, Tokyo (JP); Shunsuke Tsuda, Tokyo (JP); Ning Li, Tokyo (JP); Yuki Tsuruoka, Tokyo (JP); Shuta Okada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 224 days.

(21) Appl. No.: 18/269,265

(22) PCT Filed: Dec. 20, 2021

(86) PCT No.: PCT/JP2021/046951
§ 371 (c)(1),
(2) Date: Jun. 22, 2023

(87) PCT Pub. No.: WO2022/201679
PCT Pub. Date: Sep. 29, 2022

(65) Prior Publication Data

US 2024/0062213 A1 Feb. 22, 2024

(30) Foreign Application Priority Data

Mar. 25, 2021 (KR) ............................... 2021-051942

(51) Int. Cl.
*G06Q 20/40* (2012.01)
*G06Q 20/20* (2012.01)

(52) U.S. Cl.
CPC ....... *G06Q 20/4016* (2013.01); *G06Q 20/208* (2013.01)

(58) Field of Classification Search
CPC .. G06Q 20/4016; G06Q 20/208; G06F 18/22; G06V 20/52; G06V 30/2247;
(Continued)

(56) References Cited

U.S. PATENT DOCUMENTS 9,524,433 B2 * 12/2016 Tsunoda ............... G06V 10/987
9,569,938 B1 * 2/2017 Lampe ................. G07G 1/0018
(Continued)

FOREIGN PATENT DOCUMENTS

JP 2009-163332 A 7/2009
JP 2012-053706 A 3/2012
(Continued)

OTHER PUBLICATIONS

International Search Report for PCT Application No. PCT/JP2021/046951, mailed on Mar. 1, 2022.
(Continued)

*Primary Examiner* — Michael Jared Walker
(74) *Attorney, Agent, or Firm* — Sughrue Mion, PLLC

(57) ABSTRACT

A detection system according to an aspect of the present disclosure includes: at least one memory configured to store instructions; and at least one processor configured to execute the instructions to: acquire a number of registered commodities for which commodity registration has been performed based on notification information given upon the commodity registration by a customer; acquire a number of to-be registered commodities for which the customer is to perform commodity registration; detect a discrepancy between the number of registered commodities and the number of to-be registered commodities; and output a detection result.

10 Claims, 8 Drawing Sheets

(58) Field of Classification Search
CPC .. G07G 1/0036; G07G 1/0045; G07G 1/0054; G07G 3/003; G07G 1/01
See application file for complete search history.

(56) References Cited

U.S. PATENT DOCUMENTS 11,216,651 B2 * 1/2022 Marumo ................ G06Q 30/06
2006/0243798 A1 * 11/2006 Kundu ..................... G07G 3/00 235/383
2011/0093688 A1 * 4/2011 Wada .................... G06F 16/256 713/1
2014/0176719 A1 * 6/2014 Migdal ................ G08B 29/188 348/150
2014/0222602 A1 * 8/2014 Mihara ................ G06Q 20/209 705/23
2015/0026018 A1 * 1/2015 Nimiya ................... G06F 18/22 705/27.2
2015/0063638 A1 * 3/2015 Kakino .................. G06V 10/96 382/103
2016/0180174 A1 * 6/2016 Enomoto ............. G07G 1/0036 704/275
2018/0096567 A1 * 4/2018 Farrow .................. G06V 20/41
2021/0089757 A1 * 3/2021 Marumo .............. G06V 40/167
2021/0090054 A1 * 3/2021 Motoki ................ G08B 13/246
2022/0147963 A1 * 5/2022 Nagano .................. G06Q 50/10

FOREIGN PATENT DOCUMENTS

JP 2015-118630 A 6/2015
JP 2016-115279 A 6/2016
JP 2017-220198 A 12/2017
JP 2018-160140 A 10/2018
JP 2019-200533 A 11/2019
JP 2020-074082 A 5/2020
JP 2020-074189 A 5/2020

OTHER PUBLICATIONS

JP Office Action for JP Application No. 2023-508625, mailed on Jun. 17, 2025 with English Translation.

* cited by examiner

DETECTION SYSTEM, DETECTION METHOD, AND STORAGE MEDIUM

This application is a National Stage Entry of PCT/JP2021/046951 filed on Dec. 20, 2021, which claims priority from Japanese Patent Application 2021-051942 filed on Mar. 25, 2021, the contents of all of which are incorporated herein by reference, in their entirety.

TECHNICAL FIELD

The present disclosure relates to a technique for detecting a discrepancy in the number of commodities before and after commodity registration.

BACKGROUND ART

In stores such as supermarkets, cash register terminals with which customers themselves perform scan registration of commodities to be purchased have become widespread. On the other hand, with such a cash register terminal, there has occurred a fraudulent act in which a customer takes out some of commodities to be purchased without performing scan registration. PTL 1 discloses a technique for detecting a fraudulent act of not performing scan registration of some commodities.

CITATION LIST

Patent Literature

PTL 1: JP 2020-074082 A
PTL 2: JP 2012-053706 A

SUMMARY OF INVENTION

Technical Problem

In an existing commodity registration apparatus without such a function of fraud detection, even when the number of commodities for which a customer has performed commodity registration is acquired, modification such as correction or the like of a program used in the commodity registration apparatus is needed.

An object of the present disclosure is to provide a technique capable of suppressing modification of an existing commodity registration apparatus for acquiring the number of commodities for which a customer has performed commodity registration.

Solution to Problem

A system according to one aspect of the present disclosure includes: a first acquisition unit that acquires the number of commodities for which commodity registration has been performed based on notification information given upon the commodity registration by a customer, a second acquisition unit that acquires the number of commodities for which the customer is to perform commodity registration, a detection unit that detects a discrepancy between the number of commodities for which the commodity registration has been performed and the number of commodities for which the commodity registration is to be performed, and an output unit that outputs a detection result.

A detection method according to one mode of the present disclosure includes: acquiring the number of commodities for which commodity registration has been performed based on notification information given upon the commodity registration by a customer, acquiring the number of commodities for which the customer is to perform commodity registration, detecting a discrepancy between the number of commodities for which the commodity registration has been performed and the number of commodities for which the commodity registration is to be performed, and outputting a detection result.

A program according to one mode of the present disclosure causes a computer to execute: acquiring the number of commodities for which commodity registration has been performed based on notification information given upon the commodity registration by a customer, acquiring the number of commodities for which the customer is to perform commodity registration, detecting a discrepancy between the number of commodities for which the commodity registration has been performed and the number of commodities for which the commodity registration is to be performed, and outputting a detection result. The program may be stored in a computer-readable non-transitory storage medium.

Advantageous Effects of Invention

According to the present disclosure, it is possible to suppress modification of an existing commodity registration apparatus for acquiring the number of commodities for which a customer has performed commodity registration.

EXAMPLE EMBODIMENT

First Example Embodiment

A detection system according to one aspect of the first example embodiment will be described with reference to the drawings. The detection system according to the first example embodiment acquires the number of commodities for which a customer is to perform commodity registration and the number of commodities for which the commodity registration has been performed based on notification information given upon the commodity registration by the customer, and detects a discrepancy between the number of commodities for which the commodity registration is to be performed and the number of commodities for which the commodity registration has been performed.

Figure 1:
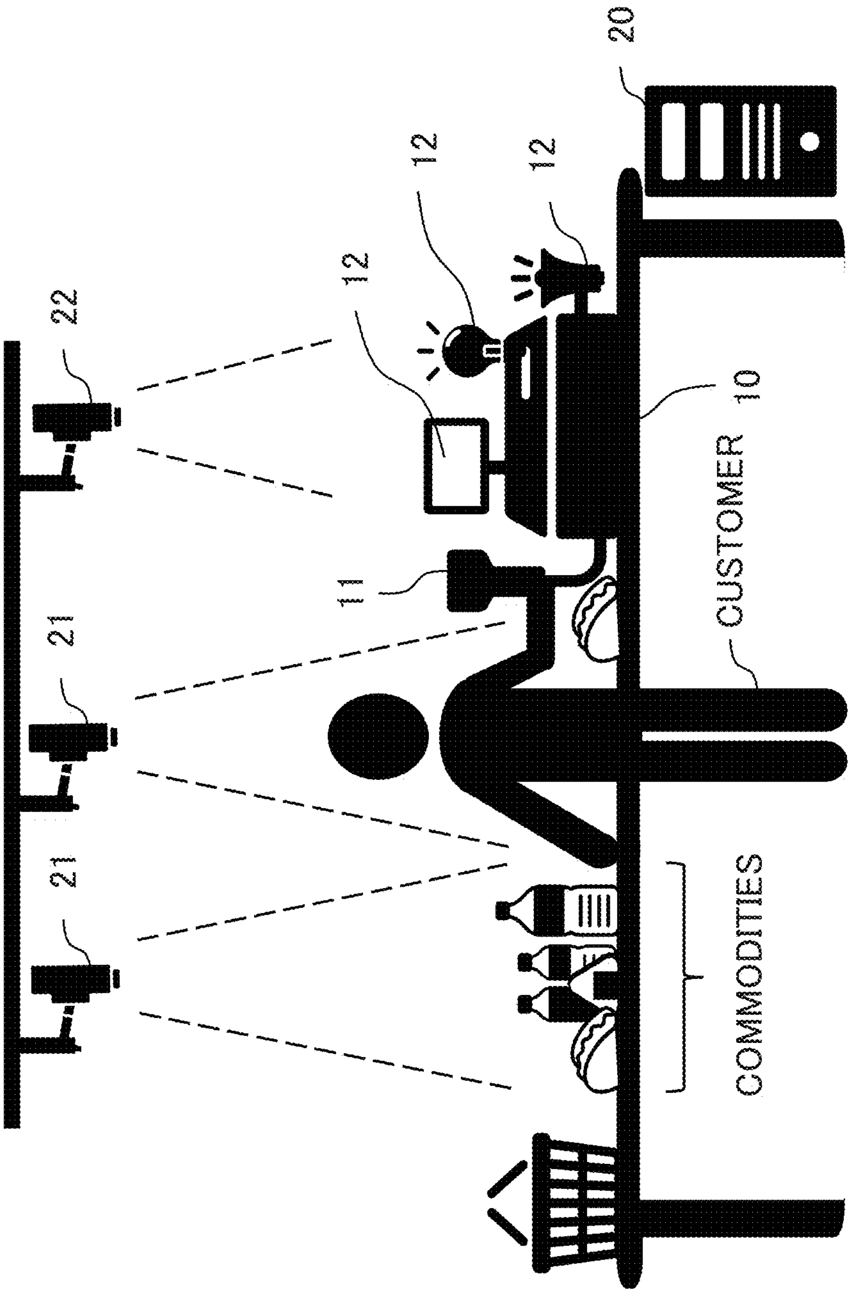
FIG. 1 is a diagram illustrating an outline of a detection system according to a first example embodiment.

An outline of the detection system according to the first example embodiment will be described with reference to FIG. 1. FIG. 1 is a diagram illustrating a state in which a customer performs commodity registration of commodities. Commodities before the commodity registration by the customer are placed on a placement base. The commodities after the commodity registration are placed at a position different from the position before the commodity registration.

A human commodity sensor 21 (commodity camera) captures commodities before the commodity registration (commodities for which the customer is to perform the commodity registration), and transmits the captured commodity image to a detection system 20. For example, the detection system 20 acquires the number of commodities for which the commodity registration is to be performed based on the commodity image from the human commodity sensor 21.

When the customer performs the commodity registration of the commodities on the placement base using a commodity reading apparatus 11, a commodity registration apparatus 10 sends notification information (commodity registration information) associated with the commodity registration to a notification device 12 (display apparatus). For the commodity registration information of the notification device 12, a display screen of the display apparatus is updated each time the commodity registration is performed. A notification sensor 22 detects the notification information (commodity registration information) displayed on the notification device 12 (display apparatus), and transmits the detected information to the detection system 20. The detection system 20 acquires the number of commodities for which the commodity registration has been performed based on the detected information. The detection system detects a discrepancy between the number of commodities for which the commodity registration is to be performed and the number of commodities for which the commodity registration has been performed.

Hereinafter, configurations of the commodity registration apparatus 10, the commodity reading apparatus 11, the notification device 12, the detection system 20, the human commodity sensor 21, and the notification sensor 22 will be described.

Figure 2:
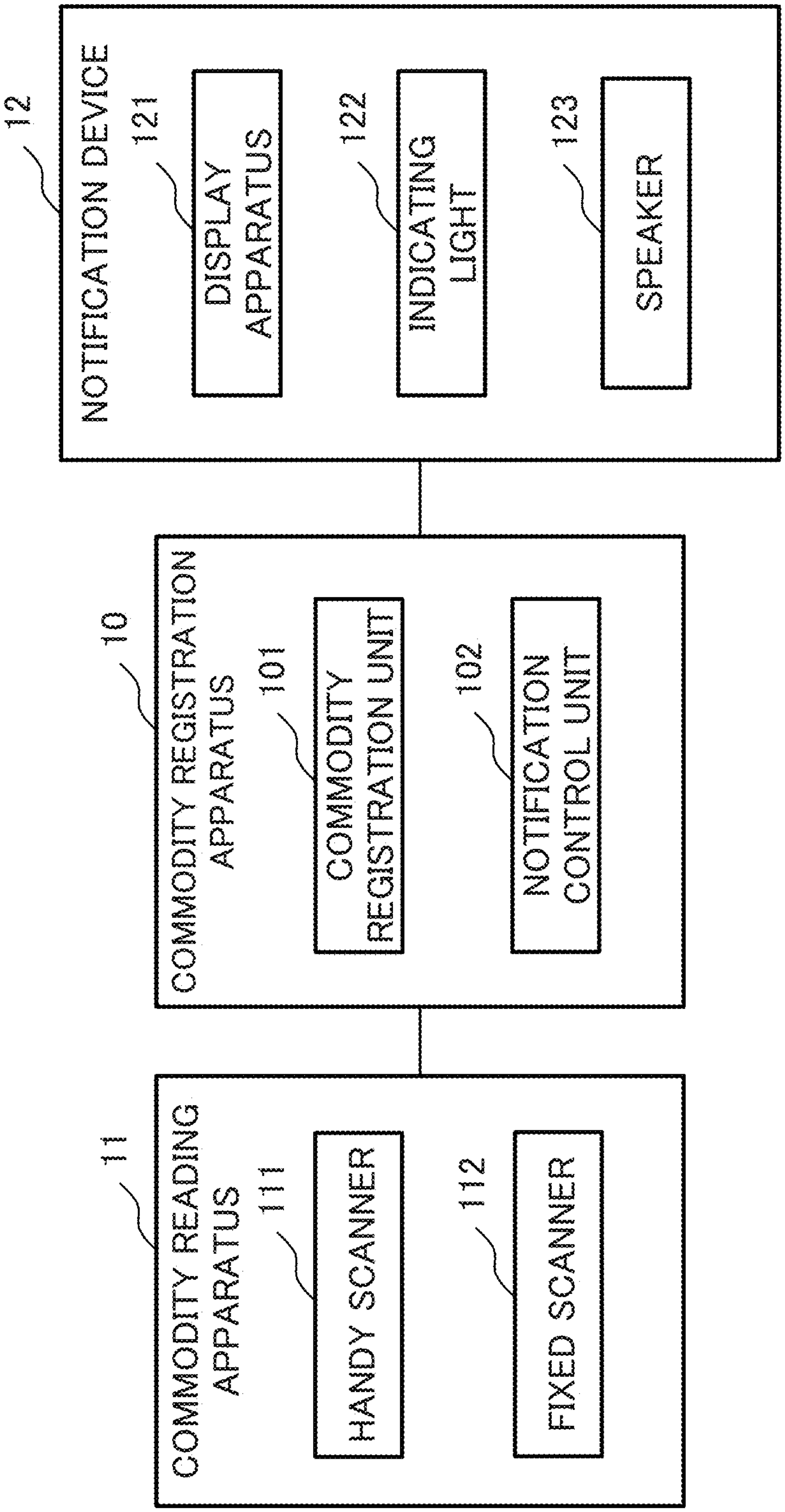
FIG. 2 is a block diagram illustrating a configuration example of a commodity reading apparatus, a commodity registration unit, and a notification device of the first example embodiment.

FIG. 2 is a block diagram illustrating a configuration example of the commodity reading apparatus, the commodity registration apparatus, and the notification device of the first example embodiment. The commodity registration apparatus 10 is connected to the commodity reading apparatus 11 and the notification device 12.

When the customer brings a commodity symbol (for example, a commodity code) of a commodity and the commodity reading apparatus 11 close to each other, the commodity reading apparatus 11 reads the commodity symbol (commodity code) of the commodity. The commodity reading apparatus 11 sends a commodity identifier obtained by decoding the read commodity symbol to the commodity registration apparatus 10.

The commodity symbol may be, for example, a barcode, a two-dimensional code, or a character symbol. The character symbol includes information for specifying commodity information. The commodity reading apparatus 11 is, for example, a barcode reader (also simply referred to as a scanner). The commodity reading apparatus 11 illustrated in FIG. 2 includes a handy scanner 111 or a fixed scanner 112. Each of the handy scanner 111 and the fixed scanner 112 may be of an image sensor type, a laser type, or the like. The commodity reading apparatus 11 may be other than the handy scanner 111 and the fixed scanner 112. Description of the commodity reading apparatus 11 is an example, and is not limited thereto.

The commodity registration apparatus 10 illustrated in FIG. 2 includes a commodity registration unit 101 and a notification control unit 102. The commodity registration apparatus 10 is, for example, a commodity registration apparatus included in a self-cash register.

The commodity registration apparatus 10 receives the commodity identifier from the commodity reading apparatus 11. The commodity registration unit 101 searches the commodity information in a commodity database (not illustrated) using the received commodity identifier, extracts a commodity name and a commodity unit price associated with the commodity identifier, generates commodity registration information, and executes the commodity registration.

The commodity registration information is, for example, a number, a commodity name, a unit price, a quantity, a subtotal amount, a total quantity, and a total amount. The number is a number assigned to each different commodity in one transaction. The quantity is the number of the same commodities for which the commodity registration has been performed. The total quantity is the sum of quantities for each commodity. When receiving another commodity identifier and extracting the commodity name and the commodity unit price, the commodity registration unit 101 increments the number, and generates and updates the commodity registration information. When receiving the same commodity identifier, the commodity registration unit 101 increments the quantity of the same commodity name, and generates and updates the commodity registration information. Each time the commodity registration information is generated or updated, the notification control unit 102 generates the notification information and transmits the notification information to the notification device 12.

The notification control unit 102 generates different notification information according to the type of the notification device 12. The notification device 12 illustrated in FIG. 2 receives the notification information from the commodity registration apparatus 10 each time the customer performs the commodity registration, and gives the notification information. The notification device 12 is, for example, a display apparatus 121, an indicating light 122, or a speaker 123. The display apparatus 121 is, for example, a liquid crystal display. The indicating light 122 is, for example, an indicator lamp. The notification device 12 may be incorporated in the commodity registration apparatus 10, or may be externally connected.

Figure 3:
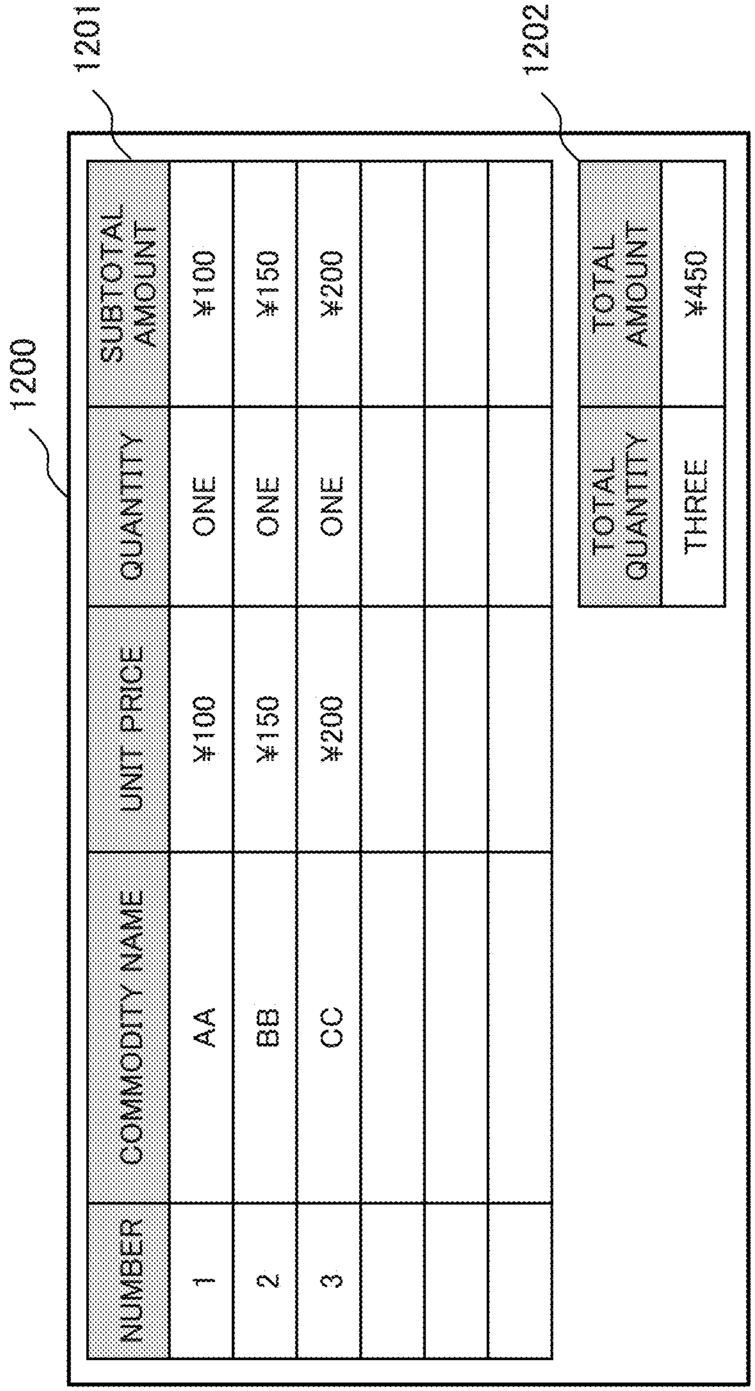
FIG. 3 is a diagram illustrating an example of notification information related to commodity registration information.

When the notification device 12 is the display apparatus 121, the notification control unit 102 generates the notification information related to the commodity registration information and causes the display apparatus 121 to display the notification information. FIG. 3 is a diagram illustrating an example of notification information related to commodity registration information. In FIG. 3, screen display 1200 includes commodity registration display 1201 and total sum display 1202. The commodity registration display 1201 includes items of a number, a commodity name, a unit price, a quantity, and a subtotal amount for each commodity for which the customer has performed the commodity registration. The total sum display 1202 includes the total quantity and the amount of the total amount. The notification control unit 102 generates the notification information with reference to the commodity registration information generated by the commodity registration unit 101 for each commodity registration.

When the notification device 12 is the indicating light 122, the notification information is light emission of the indicating light 122 for giving notification of the commodity registration. A light emission signal is transmitted from the commodity registration apparatus 10 to the indicating light 122 for each commodity registration. Alternatively, when the notification device 12 is the speaker 123, the notification information is a notification sound for giving notification of the commodity registration. A notification sound signal is transmitted from the commodity registration apparatus 10 to the speaker 123 for each commodity registration.

Figure 4:
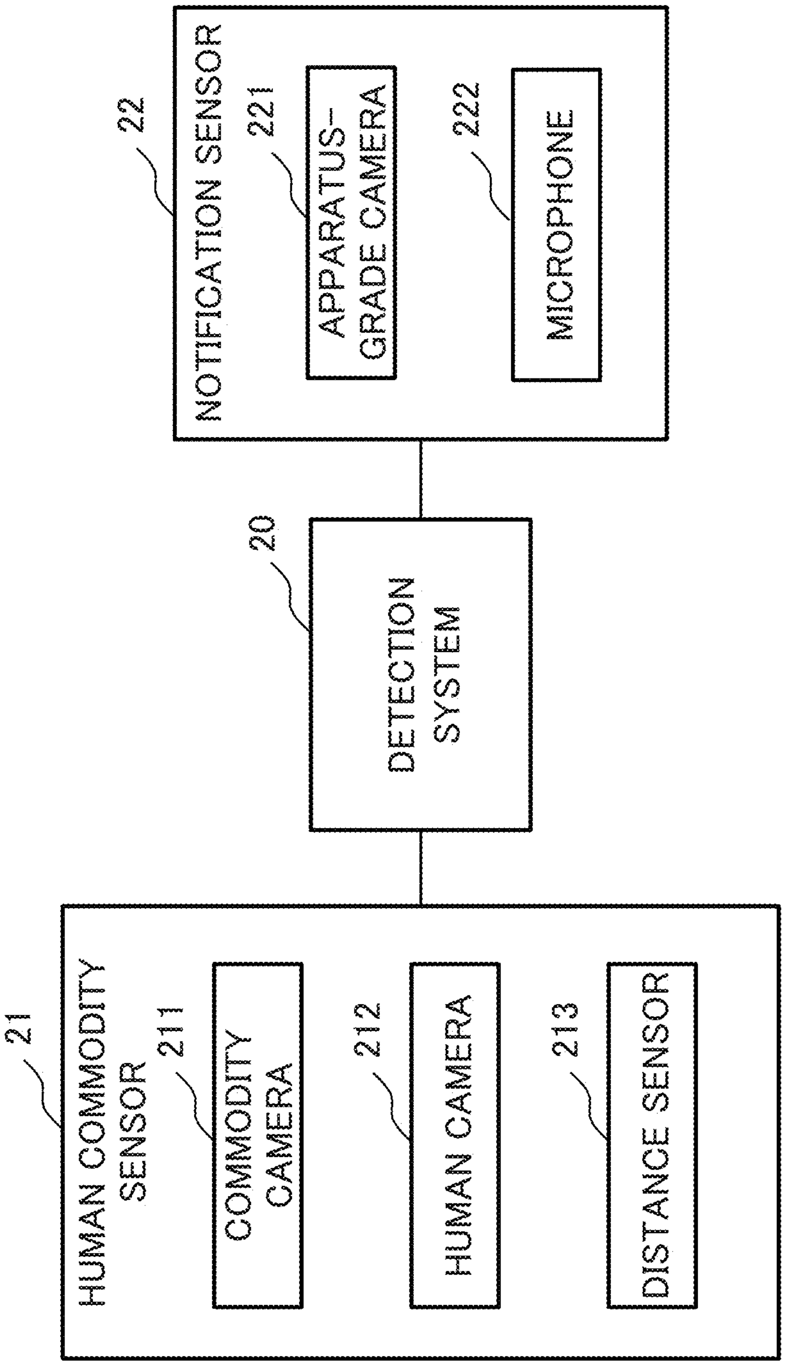
FIG. 4 is a block diagram illustrating an example of configurations of a human commodity sensor and a detection sensor of the first example embodiment.

Next, the detection system 20, the human commodity sensor 21, and the notification sensor 22 according to the first example embodiment will be described. FIG. 4 is a block diagram illustrating a configuration example of the human commodity sensor and the notification sensor of the first example embodiment. The detection system 20 is connected to the human commodity sensor 21 (also referred to as a first sensor) and the notification sensor 22 (also referred to as a second sensor).

The human commodity sensor 21 illustrated in FIG. 4 is a commodity camera 211, a human camera 212, or a distance sensor 213. The commodity camera 211, for example, captures commodities before the customer performs the commodity registration (commodities for which the customer is to perform the commodity registration), and transmits the captured commodity image to the detection system 20. For example, the human camera 212 captures a motion of the customer of causing the commodity reading apparatus 11 to read the commodity symbol of a commodity, and transmits the captured motion image to the detection system 20. The distance sensor 213 senses, for example, the area above the placement base including a commodity before the commodity registration from a predetermined position, and sends distance measurement information of the area above the placement base to the detection system 20. The distance sensor 213 may be, for example, of either an optical type or a radio type. Description of the human commodity sensor 21 is an example, and is not limited thereto.

The notification sensor 22 illustrated in FIG. 4 captures the notification information (for example, the total quantity of commodities for which the commodity registration has been performed) regarding the commodity registration information displayed on the screen of the notification device 12 (for example, the display apparatus 121). The notification sensor 22 may capture a change in the commodity registration information updated according to the commodity registration and use the change as the notification information.

The notification sensor 22 is, for example, an apparatus-grade camera 221 that captures the notification device 12 of the commodity registration apparatus 10. The notification sensor 22 sends the captured notification information (first notification information) to the detection system 20. The notification sensor 22 (apparatus-grade camera 221) captures a video of the notification device 12 (indicating light 122) turned on each time the commodity registration apparatus 10 performs the commodity registration, and sends the notification information (second notification information) regarding lighting of the captured notification device 12 to the detection system 20.

Alternatively, the notification sensor 22 (for example, microphone 222) records a notification sound to be output from the notification device 12 (for example, the speaker 123) each time the commodity registration apparatus 10 performs the commodity registration. The notification sensor 22 sends the notification information (third notification information) regarding the recorded notification sound of the notification device 12 to the detection system 20. Description of the notification sensor 22 is an example, and is not limited thereto.

Figure 5:
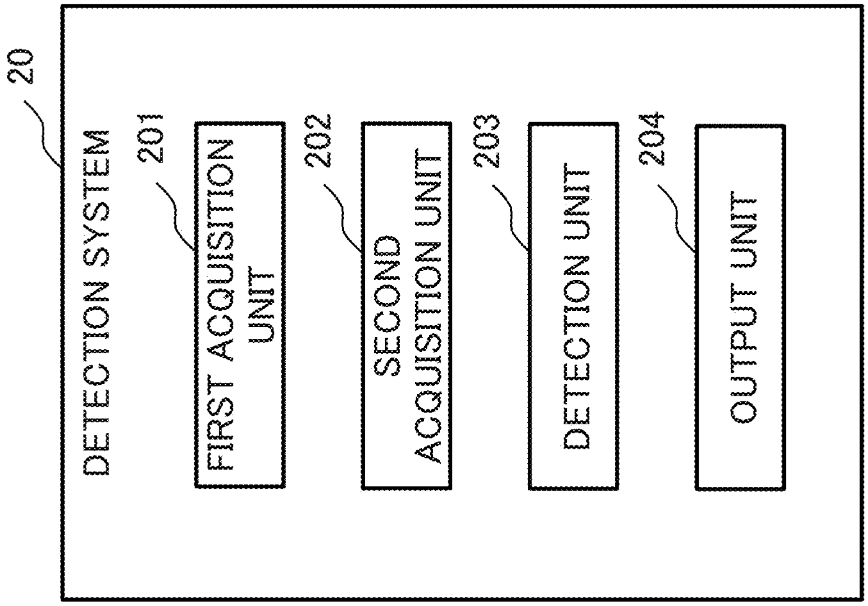
FIG. 5 is a block diagram illustrating an example of a configuration of the detection system according to the first example embodiment.

Next, the detection system 20 according to the first example embodiment will be described. FIG. 5 is a block diagram illustrating a configuration example of the detection system according to the first example embodiment. The detection system 20 illustrated in FIG. 5 includes a first acquisition unit 201, a second acquisition unit 202, a detection unit 203, and an output unit 204.

The first acquisition unit 201 acquires the number of commodities for which the customer is to perform the commodity registration. For example, the first acquisition unit 201 performs image recognition processing on the received commodity image, and acquires the number of commodities for which the customer is to perform the commodity registration in the commodity image. The first acquisition unit 201 performs motion detection processing on the received motion image, and extracts the number of times of motions (commodity scan motions) in which the customer causes the commodity reading apparatus 11 to read the commodity symbol of the commodity. The first acquisition unit 201 acquires the number of times of commodity scan motion as the number of commodities for which the commodity registration is to be performed. Alternatively, the first acquisition unit 201 may acquire the number of commodities for which the customer is to perform the commodity registration based on the received distance measurement information. Specifically, the first acquisition unit 201 extracts the number of protrusion shapes on the placement base included in the distance measurement information, and sets the number as the number of commodities. The first acquisition unit 201 sends the number of commodities for which the customer is to perform the commodity registration to the detection unit 203. Description of the first acquisition unit 201 is an example, and is not limited thereto.

Figure 6:
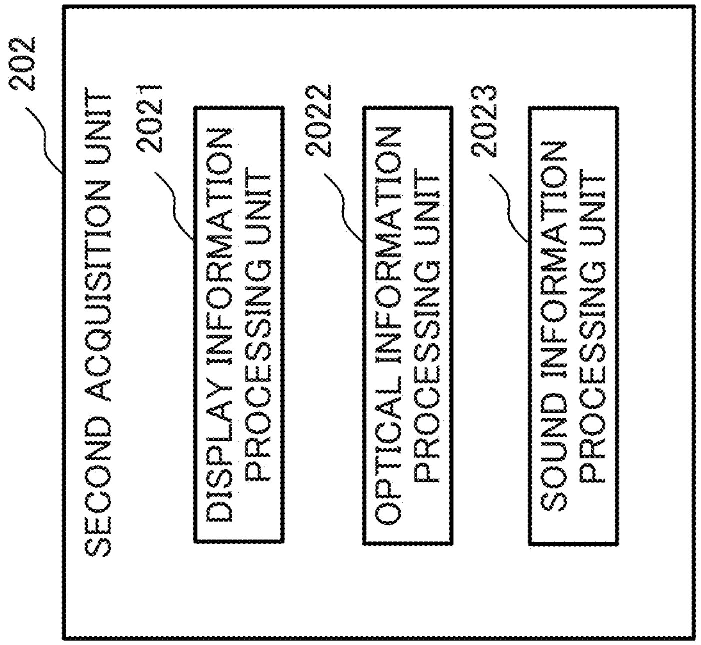
FIG. 6 is a block diagram illustrating an example of a configuration of a second acquisition unit of the detection system.

The second acquisition unit 202 acquires the number of commodities for which the commodity registration has been performed based on the notification information given upon the commodity registration by the customer. FIG. 6 is a block diagram illustrating a configuration of the second acquisition unit of the detection system. The second acquisition unit 202 includes a display information processing unit 2021, an optical information processing unit 2022, or a sound information processing unit 2023. The notification information from the notification sensor 22 is the first notification information, the second notification information, or the third notification information.

When the notification information received by the second acquisition unit 202 is the first notification information, the display information processing unit 2021 performs image recognition on the image information regarding the commodity registration information displayed on the screen of the display apparatus 121, and acquires the number of commodities for which the commodity registration has been performed. Specifically, when the image information is the screen display 1200 illustrated in FIG. 3, the display information processing unit 2021 performs character recognition on the number in the total quantity field of the total sum display 1202, and acquires the number of commodities for which the commodity registration has been performed.

Alternatively, by using the transition of the screen of the commodity registration information displayed on the display apparatus 121 each time the customer performs the commodity registration of commodities, the display information processing unit 2021 may acquire the number of times the screen display 1200 has changed due to the commodity registration by the customer as the number of commodities for which the commodity registration has been performed.

When the notification information received by the second acquisition unit 202 is the second notification information, the optical information processing unit 2022 acquires the number of commodities for which the commodity registration has been performed based on the video information regarding the indicating light 122 that is turned on and off each time the commodity registration is performed. Specifically, the indicating light 122 is turned on and off each time the customer performs the commodity registration. The optical information processing unit 2022 counts the number of times the indicating light 122 is turned on, and acquires the number of commodities for which the commodity registration has been performed.

When the notification information received by the second acquisition unit 202 is the third notification information, the sound information processing unit 2023 acquires the number of commodities for which the commodity registration has been performed based on the sound information regarding the notification sound given from the speaker 123 each time the commodity registration is performed. Specifically, the notification sound is output from the speaker 123 each time the customer performs the commodity registration. The sound information processing unit 2023 counts the number of times of the notification sound, and acquires the number of commodities for which the commodity registration has been performed.

The second acquisition unit 202 sends the number of commodities for which the customer has performed the commodity registration to the detection unit 203. The detection unit 203 detects a discrepancy between the number of commodities for which the customer is to perform the commodity registration and the number of commodities for which the customer has performed the commodity registration. The detection unit 203 may detect, as a discrepancy, only a case where the number of commodities for which the commodity registration has been performed is smaller than the number of commodities for which the commodity registration is to be performed. In this case, for example, with a self-cash register including the commodity registration apparatus 10, it is possible to detect a fraudulent act of a customer taking out some of commodities to be purchased without performing scan registration or a case where a customer has failed to normally perform scan registration due to a scan mistake or the like. The detection unit 203 may detect, as a discrepancy, only a case where the number of commodities for which the commodity registration has been performed is larger than the number of commodities for which the commodity registration is to be performed. In this case, it is possible to detect a case where a customer has erroneously performed the commodity registration for a commodity that is not to be purchased. In the present example embodiment, both or at least one of a case where the number of commodities for which the commodity registration has been performed is smaller than the number of commodities for which the commodity registration is to be performed and a case where the number of commodities for which the commodity registration has been performed is larger than the number of commodities for which the commodity registration is to be performed is detected. The detection unit 203 sends a detection result to the output unit 204.

The output unit 204 outputs the detection result. For example, the detection result is a discrepancy or concordance between the number of commodities for which the customer is to perform the commodity registration and the number of commodities for which the customer has performed the commodity registration. The output unit 204 may give notice of an error in the case of discrepancy, and may output, as an example, a message prompting redoing of the commodity registration or a message prompting confirmation of the content of the commodity registration. Alternatively, the output unit 204 may output a message indicating that the commodity registration by the customer is normally completed. Different messages may be output depending on whether the number of commodities for which the commodity registration has been performed is larger or smaller than the number of commodities for which the commodity registration is to be performed.

Figure 7:
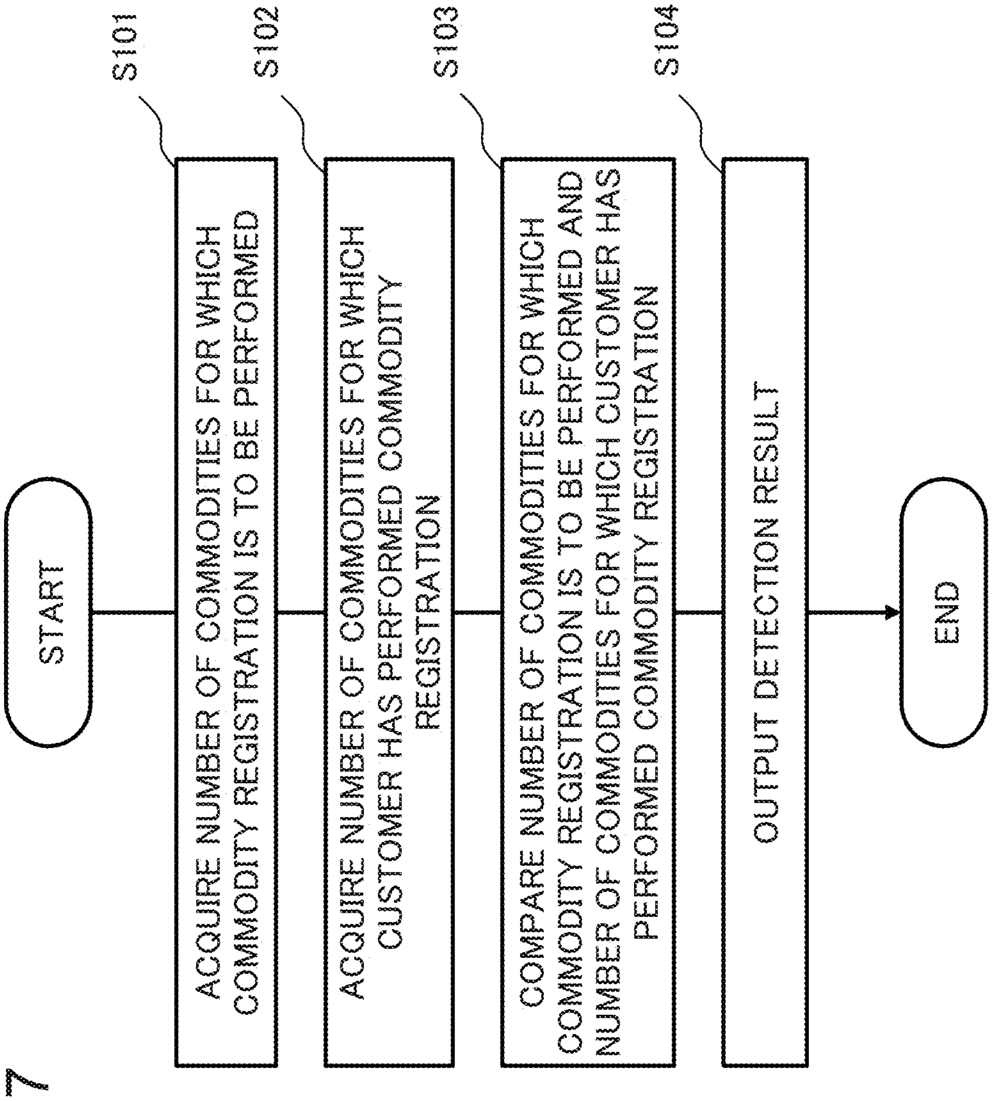
FIG. 7 is a flowchart illustrating an example of an operation of the detection system according to the first example embodiment.

FIG. 7 is a flowchart illustrating an operation example of the detection system according to the first example embodiment.

The commodity camera 211 of the human commodity sensor 21 captures commodities on the placement base before the commodity registration (commodities for which the customer is to perform commodity registration), and transmits the captured commodity image to the detection system 20. The first acquisition unit 201 of the detection system 20 acquires the number of commodities for which the commodity registration is to be performed based on the commodity image from the commodity camera 211 (step S101). Specifically, the first acquisition unit 201 performs image identification processing on the commodity image, extracts the number of commodities in the image, and acquires the number of commodities for which the commodity registration is to be performed. Acquisition of the number of commodities for which the commodity registration is to be performed by the first acquisition unit 201 is not limited thereto.

For example, the human camera 212 of the human commodity sensor 21 captures a motion of the customer of causing the commodity reading apparatus 11 to read the commodity symbol of a commodity, and transmits the captured motion image to the detection system 20. The first acquisition unit 201 performs motion detection processing on the received motion image, and extracts the number of times of motions (commodity scan motions) in which the customer causes the commodity reading apparatus 11 to read the commodity symbol. The first acquisition unit 201 acquires the number of times of commodity scan motion as the number of commodities for which the commodity registration is to be performed.

Alternatively, the distance sensor 213 of the human commodity sensor 21 senses the area above the placement base including a commodity before the commodity registration from a predetermined position, and sends distance measurement information of the area above the placement base to the detection system 20. The first acquisition unit 201 the first acquisition unit 201 may acquire the number of commodities for which the customer is to perform the commodity registration based on the received distance measurement information. Specifically, the first acquisition unit 201 extracts the number of protrusion shapes on the placement base included in the distance measurement information, and sets the number as the number of commodities for which the customer is to perform the commodity registration. The first acquisition unit 201 sends the number of commodities for which the customer is to perform the commodity registration to the detection unit 203.

When the customer performs the commodity registration of the commodities on the placement base using the commodity reading apparatus 11, the commodity registration apparatus 10 sends notification information associated with the commodity registration to the notification device 12. For example, when the notification device 12 is the display apparatus 121, the display screen of the display apparatus 121 is updated each time the commodity registration is performed according to the notification information. When the notification device 12 is the indicating light 122, the indicating light is turned on and off each time the commodity registration is performed according to the notification information. Alternatively, when the notification device 12 is the speaker 123, the notification sound is output according to the notification information.

The notification sensor 22 detects the notification information given upon the commodity registration by the customer and transmits the detected information to the detection system 20. The detection system 20 acquires the number of commodities for which the commodity registration has been performed based on the detected information (step S102). For example, the display information processing unit 2021 of the second acquisition unit 202 performs image recognition on the image information regarding the commodity registration information displayed on the screen of the display apparatus 121. Specifically, the display information processing unit 2021 performs character recognition on the number in the total quantity field of the total sum display 1202, and acquires the number of commodities for which the commodity registration has been performed.

Alternatively, by using the transition of the screen of the commodity registration information displayed on the display apparatus 121 each time the customer performs the commodity registration of commodities, the display information processing unit 2021 may acquire the number of times the screen display 1200 has changed due to the commodity registration by the customer as the number of commodities for which the commodity registration has been performed.

The optical information processing unit 2022 of the second acquisition unit 202 acquires the number of commodities for which the commodity registration has been performed based on the video information regarding the indicating light 122 that is turned on and off each time the commodity registration is performed. Specifically, the optical information processing unit 2022 counts the number of times the indicating light 122 is turned on each time the customer performs the commodity registration, and acquires the number of commodities for which the commodity registration has been performed.

The sound information processing unit 2023 of the second acquisition unit 202 acquires the number of commodities for which the commodity registration has been performed based on the sound information regarding the notification sound given from the speaker 123 each time the commodity registration is performed. Specifically, the sound information processing unit 2023 counts the number of times the notification sound given from the speaker 123 each time the customer performs the commodity registration, and acquires the number of commodities for which the commodity registration has been performed.

The second acquisition unit 202 sends the number of commodities for which the customer has performed the commodity registration to the detection unit 203. The detection unit 203 detects a discrepancy between the number of commodities for which the customer is to perform the commodity registration and the number of commodities for which the customer has performed the commodity registration (step S103). The detection unit 203 sends a detection result to the output unit 204.

The output unit 204 outputs the detection result (step S104). The detection result is a discrepancy or concordance between the number of commodities for which the customer is to perform the commodity registration and the number of commodities for which the customer has performed the commodity registration.

Effects of First Example Embodiment

According to the first example embodiment, it is possible to suppress modification of an existing commodity registration apparatus for acquiring the number of commodities for which the customer has performed the commodity registration. This is because the first acquisition unit 201 acquires the number of commodities for which the commodity registration has been performed based on the notification information given upon the commodity registration by the customer.

Hardware Configuration

Figure 8:
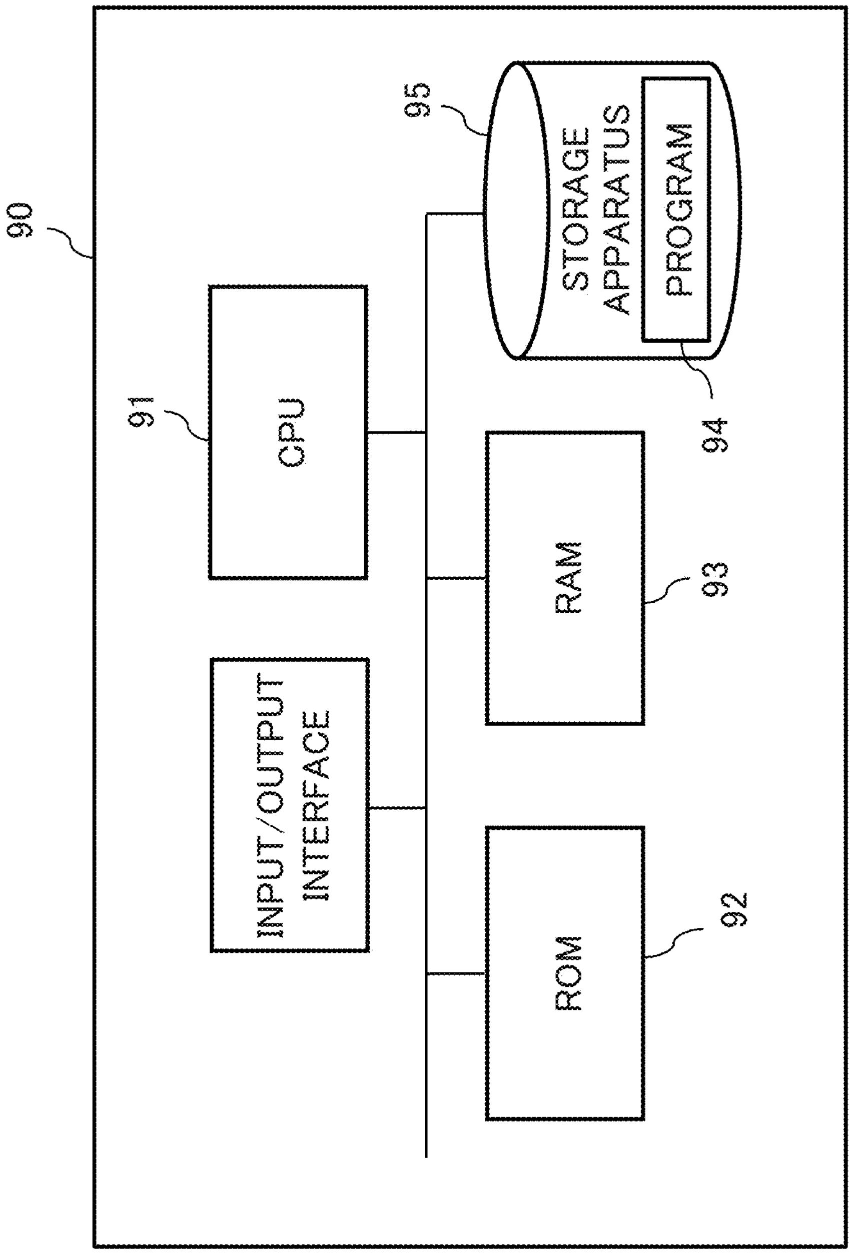
FIG. 8 is a diagram illustrating a hardware configuration of a computer.

FIG. 8 is a diagram illustrating an example of a hardware configuration of a computer. The functions of the first acquisition unit 201, the second acquisition unit 202, the detection unit 203, and the output unit 204 of the detection system 20 are achieved by a central processing unit (CPU) 21 executing a program 94. The function of the detection system 20 may be configured by an external apparatus (not illustrated), and provided from the external apparatus to the detection system 20 via a network. In the detection system 20, the CPU 91 may read the program 94 from read only memory (ROM) 92 or a storage apparatus 95, and the program may be executed by the CPU 91 or random access memory (RAM) 93.

The present disclosure described using the above-described example embodiment as an example can be regarded as being configured by a code indicating a computer program or a computer-readable storage medium storing the code indicating the computer program. The computer-readable storage medium is, for example, the storage apparatus 95, a removable magnetic disk medium, an optical disk medium, a memory card, or the like, which is not illustrated. The configuration of each example embodiment may be dedicated hardware by an integrated circuit. The detection system 20 may be achieved by cloud computing.

The present disclosure is not limited to the above-described example embodiment, and various changes can be made, and an example embodiment obtained by appropriately combining configurations, operations, and pieces of processing disclosed in different example embodiments is also included in the technical scope of the present disclosure.

The present disclosure has been described above using the above-described example embodiment as an exemplary example. However, the present disclosure is not limited to the above-described example embodiment. That is, the present disclosure can apply various aspects that can be understood by those skilled in the art within the scope of the present disclosure.

This application is based upon and claims the benefit of priority from Japanese patent application No. 2021-051942, filed on Mar. 25, 2021, the disclosure of which is incorporated herein in its entirety by reference.

Part or all of the above example embodiment may be described as the following supplementary notes, but is not limited to the following.

SUPPLEMENTARY NOTE

Supplementary Note 1

A detection system including:

a first acquisition means configured to acquire the number of commodities for which commodity registration has been performed based on notification information given upon the commodity registration by a customer;

a second acquisition means configured to acquire the number of commodities for which the customer is to perform commodity registration;

a detection means configured to detect a discrepancy between the number of commodities for which the commodity registration has been performed and the number of commodities for which the commodity registration is to be performed; and an output means configured to output a detection result.

Supplementary Note 2

The detection system according to supplementary note 1, in which the notification information is commodity registration information displayed on a display screen of a commodity registration apparatus each time the customer performs the commodity registration.

Supplementary Note 3

The detection system according to supplementary note 2, in which the first acquisition means acquires, as the number of commodities for which the commodity registration has been performed, a total quantity of commodities included in the commodity registration information and updated each time the customer performs the commodity registration.

Supplementary Note 4

The detection system according to supplementary note 2, in which the first acquisition means acquires, as the number of commodities for which the commodity registration has been performed, the number of changes in the commodity registration information updated each time the customer performs the commodity registration.

Supplementary Note 5

The detection system according to any one of supplementary notes 1 to 4, in which the notification information is the number of times of lighting given by an indicating light of a commodity registration apparatus each time the customer performs the commodity registration.

Supplementary Note 6

The detection system according to any one of supplementary notes 1 to 5, in which the notification information is the number of times of a notification sound given from a speaker of a commodity registration apparatus each time the customer performs the commodity registration.

Supplementary Note 7

The detection system according to any one of supplementary notes 1 to 6, in which the second acquisition means acquires the number of commodities for which the customer is to perform the commodity registration based on a commodity image obtained by capturing a commodity before the customer performs the commodity registration.

Supplementary Note 8

The detection system according to any one of supplementary notes 1 to 6, in which the second acquisition means acquires the number of commodities for which the customer is to perform the commodity registration based on a motion image obtained by capturing a motion of the commodity registration by the customer.

Supplementary Note 9

A detection method including:

acquiring the number of commodities for which commodity registration has been performed based on notification information given upon the commodity registration by a customer;

acquiring the number of commodities for which the customer is to perform commodity registration;

detecting a discrepancy between the number of commodities for which the commodity registration has been performed and the number of commodities for which the commodity registration is to be performed; and outputting a detection result.

Supplementary Note 10

A storage medium non-transitorily storing a program for causing a computer to execute:

acquiring the number of commodities for which commodity registration has been performed based on notification information given upon the commodity registration by a customer;

acquiring the number of commodities for which the customer is to perform commodity registration;

detecting a discrepancy between the number of commodities for which the commodity registration has been performed and the number of commodities for which the commodity registration is to be performed; and outputting a detection result.

REFERENCE SIGNS LIST

10 commodity registration apparatus
11 commodity reading apparatus
12 notification device
20 detection system
21 human commodity sensor
22 notification sensor
101 commodity registration unit
102 notification control unit
111 handy scanner
112 fixed scanner
121 display apparatus
122 indicating light
123 speaker
201 first acquisition unit
202 second acquisition unit
203 detection unit
204 output unit
211 commodity camera
212 human camera
213 distance sensor

221 apparatus-grade camera

222 microphone

2021 display information processing unit

2022 optical information processing unit

2023 sound information processing unit

What is claimed is:

1. A detection system suppressing modification of a commodity registration apparatus, the detection system comprising:

at least one memory configured to store instructions; and at least one processor configured to execute the instructions to:

locate a specific field within a display screen of the commodity registration apparatus;

perform character recognition on the located specific field to extract numerical characters from a video capturing the display screen which displays a number of registered commodities currently registered each time the customer performs commodity registration;

acquire the number of registered commodities for which commodity registration has been performed, wherein the number of registered commodities is acquired by converting the extracted numerical characters into the number of registered commodities;

acquire a number of to-be registered commodities for which the customer is to perform commodity registration;

detect a discrepancy between the number of registered commodities and the number of to-be registered commodities; and output a detection result indicating the detected discrepancy between the number of registered commodities and the number of to-be registered commodities.

2. The detection system according to claim 1, wherein the at least one processor is further configured to execute the instructions to:

acquire, as the number of registered commodities, a total quantity of commodities included in the commodity registration information and updated each time the customer performs the commodity registration.

3. The detection system according to claim 1, wherein the at least one processor is further configured to execute the instructions to:

acquire, as the number of registered commodities, a number of updates of the commodity registration information updated each time the customer performs the commodity registration.

4. The detection system according to claim 1, wherein the at least one processor is further configured to execute the instructions to:

acquire the number of to-be registered commodities based on a commodity image obtained by capturing a commodity before the customer performs the commodity registration.

5. The detection system according to claim 1, wherein the at least one processor is further configured to execute the instructions to:

acquire a number of to-be registered commodities based on a motion image obtained by capturing a motion of the commodity registration by the customer.

6. A detection method of suppressing modification of a commodity registration apparatus, the detection method comprising:

locating a specific field within a display screen of the commodity registration apparatus;

performing character recognition on the located specific field to extract numerical characters from a video capturing the display screen which displays a number of registered commodities currently registered each time the customer performs commodity registration;

acquiring the number of registered commodities for which commodity registration has been performed, wherein the number of registered commodities is acquired by converting the extracted numerical characters into the number of registered commodities;

acquiring a number of to-be registered commodities for which the customer is to perform commodity registration;

detecting a discrepancy between the number of registered commodities and the number of to-be registered commodities; and outputting a detection result indicating the detected discrepancy between the number of registered commodities and the number of to-be registered commodities.

7. A non-transitory storage medium storing a program for causing a computer to suppress modification of a commodity registration apparatus by executing:

locating a specific field within a display screen of the commodity registration apparatus;

performing character recognition on the located specific field to extract numerical characters from a video capturing the display screen which displays a number of registered commodities currently registered each time the customer performs commodity registration;

acquiring the number of registered commodities for which commodity registration has been performed, wherein the number of registered commodities is acquired by converting the extracted numerical characters into the number of registered commodities;

acquiring a number of to-be registered commodities for which the customer is to perform commodity registration;

detecting a discrepancy between the number of registered commodities and the number of to-be registered commodities; and outputting a detection result indicating the detected discrepancy between the number of registered commodities and the number of to-be registered commodities.

8. The detection system according to claim 1, wherein the performing character recognition from the video capturing the display screen comprises performing character recognition on a number in a total quantity field displayed on the display screen to acquire the number of registered commodities for which commodity registration has been performed.

9. The detection system according to claim 1, wherein an indicating light of the commodity registration apparatus is turned on and off each time the customer performs the commodity registration, and wherein the at least one processor is configured to execute the instructions to:

count a number of times the indicating light is turned on to acquire the number of registered commodities for which commodity registration has been performed;

analyze pixel values in a region corresponding to the indicating light across successive frames;

detect state transitions between an on-state and an off-state based on comparison of the pixel values;

identify individual lighting events by detecting transitions from an off-state to an on-state;

acquire the number of registered commodities for which commodity registration has been performed, wherein the number of registered commodities is acquired by incrementing a counter for each identified lighting event to determine the number of registered commodities.

10. The detection system according to claim 1, wherein the at least one processor is configured to execute the instructions to count the number of times of the notification sound to acquire the number of registered commodities for which commodity registration has been performed.

* * * * *